(12) United States Patent
Zhang et al.

(10) Patent No.: US 12,126,395 B2
(45) Date of Patent: Oct. 22, 2024

(54) METHOD AND APPARATUS FOR GENERATING EQUIVALENT NONLINEAR NOISE

(71) Applicant: FUJITSU LIMITED, Kawasaki (JP)

(72) Inventors: Ke Zhang, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 17/894,711

(22) Filed: Aug. 24, 2022

(65) Prior Publication Data

US 2023/0082707 A1    Mar. 16, 2023

(30) Foreign Application Priority Data

Sep. 15, 2021 (CN) .......................... 202111082565.5

(51) Int. Cl.
*H04B 17/345* (2015.01)
*H04L 1/20* (2006.01)

(52) U.S. Cl.
CPC .......... *H04B 17/345* (2015.01); *H04L 1/203* (2013.01)

(58) Field of Classification Search
CPC .... H04B 17/345; H04B 17/0085; H04L 1/203
See application file for complete search history.

(56) References Cited

U.S. PATENT DOCUMENTS

| | | | | |
|---|---|---|---|---|
| 5,721,694 A | * | 2/1998 | Graupe | H03H 21/0016 704/226 |
| 5,909,436 A | * | 6/1999 | Engstrom | H04W 52/322 370/335 |
| 8,594,499 B1 | | 11/2013 | Roberts et al. | |
| 2004/0085143 A1 | * | 5/2004 | Stoddard | H03B 29/00 331/74 |

(Continued)

FOREIGN PATENT DOCUMENTS

| | | |
|---|---|---|
| CN | 101485122 A | 7/2009 |
| CN | 112491478 A | 3/2021 |

OTHER PUBLICATIONS

M. Shimokoshi et al. "Estimation of the Bit Error Rate in a PRML Channel, Taking Account of ReadNVrite Nonlinearity", Journal of the Magnetics Society of Japan, vol. 22, No. 4-2, 285-288 (1998); (4 pages).

(Continued)

*Primary Examiner* — Vineeta S Panwalkar
(74) *Attorney, Agent, or Firm* — STAAS & HALSEY LLP (57) ABSTRACT

The present disclosure provides a method and apparatus for generating equivalent nonlinear noise. The method includes randomly generating white noise obeying zero-mean Chi-square distribution; and filtering the input white noise by using an equivalent nonlinear noise spectrum as an equivalent nonlinear filter to obtain the equivalent nonlinear noise. According to the embodiments of the present application, equivalent nonlinear noise may be generated based on (Continued)

zero-mean Chi-square distribution random variables combined with equivalent nonlinear noise spectrum filtering, and more accurate equivalent nonlinear noise than the related art may be generated, thus accurately evaluating an influence of nonlinearity of devices on Bit Error Rate (BER).

9 Claims, 6 Drawing Sheets

(56) References Cited

U.S. PATENT DOCUMENTS

2007/0254592 A1 11/2007 McCallister et al.
2009/0074115 A1* 3/2009 Ghosh ............... H04L 25/03318
 714/795

OTHER PUBLICATIONS

Damien, et al. "Chi-square statistical models as a good base for the optimisation of optical communication systems", Int. Conf. Photonics in Switching. Dec. 31, 2008; (2 pages).
Vandersteen, Gerd, et al. "Quasi-analytical bit-error-rate analysis technique using best linear approximation modeling." IEEE Transactions on Instrumentation and Measurement, vol. 58, No. 2, Feb. 2009, 475-481 (8 pages).
Giovanni Santella, et al. "A Hybrid Analytical-Simulation Procedure for Performance Evaluation in M-QAM-OFDM Schemes in Presence of Nonlinear Distortions" IEEE Transactions on Vehicular Technology, vol. 47, No. 1, Feb. 1998; 142-150 (10 pages).
Giovanni Santella, et al., "A Hybrid Analytical-Simulation Procedure for Performance Evaluation in M-QAM-OFDM Schemes in Presence of Nonlinear Distortions", IEEE Transactions on Vehicular Technology, vol. 47, No. 1, Feb. 1998.

* cited by examiner

METHOD AND APPARATUS FOR GENERATING EQUIVALENT NONLINEAR NOISE

CROSS-REFERENCE TO RELATED APPLICATIONS

This application claims priority under 35 USC 119 to Chinese patent application no. 202111082565.5, filed on Sep. 15, 2021, in the China National Intellectual Property Administration, the entire contents of which are incorporated herein by reference.

FIELD

The present disclosure relates to the field of communications, and particularly to a method and apparatus for generating equivalent nonlinear noise.

BACKGROUND

With the development of the communication technologies, the influence of nonlinearity of devices on the transmission performance of a communication system becomes more and more important. In order to quickly and conveniently evaluate the influence of nonlinearity of devices on a Bit Error Rate (BER) of the communication system, which is a key performance index, people propose a method that combines a Best Linear Approximation (BLA) model with a Crest Factor analysis, thus avoiding an BER analysis relying on brute forces (e.g., Monte Carlo).

A BLA model divides an output of a nonlinear system into two parts, i.e., components related to an input signal and a nonlinear noise source unrelated to the input signal determined by a best linear filter of the system. White noise independent of the input signal is filtered and is used to equivalently replace the original nonlinear noise source. For an input excitation signal with a probability distribution function (PDF) similar to a Gaussian distribution, it is considered that the equivalent nonlinear noise used for substitution is also in the Gaussian distribution.

It should be noted that the above introduction to the technical background is only for the convenience of the clear and complete explanation of the technical solutions of the present disclosure and the understanding by those skilled in the art. It should not be considered that the above technical solutions are well known to those skilled in the art just because these solutions are described in the background section of the present disclosure.

SUMMARY

The inventor finds that when there is a strong Intersymbol Interference (ISI) in a to-be-measured nonlinear system, whether white Gaussian noise is used to emulate in-band nonlinear noise or colored Gaussian noise is used to emulate nonlinear noise in the whole frequency band, the estimated BER value is very different from a reference value, which cannot accurately reflect the magnitude of a nonlinear impairment.

To solve the above or other similar problems, the embodiments of the present disclosure provide a method and apparatus for generating equivalent nonlinear noise.

According to a first aspect of the embodiments of the present disclosure, there is provided an apparatus for generating equivalent nonlinear noise, including: a generating unit configured to randomly generate white noise obeying zero-mean Chi-square distribution; and a filtering unit configured to filter the input white noise by using an equivalent nonlinear noise spectrum as an equivalent nonlinear filter to obtain equivalent nonlinear noise.

According to another aspect of the embodiments of the present disclosure, there is provided an apparatus for evaluating system performance, including: a generating unit configured to generate equivalent nonlinear noise by using the apparatus according to the first aspect; an evaluating unit configured to perform system performance evaluation by using the equivalent nonlinear noise.

According to still another aspect of the embodiments of the present disclosure, there is provided an apparatus for generating equivalent nonlinear complex noise, including: a generating unit configured to generate two mutually independent groups of equivalent nonlinear real noise by using the apparatus according to the first aspect; and a processing unit configured to combine the two mutually independent groups of equivalent nonlinear real noise to obtain corresponding complex noise, and apply a random common phase rotation to the complex noise to obtain equivalent nonlinear complex noise.

One of the advantageous effects of the embodiments of the present disclosure is that, according to the embodiments of the present application, equivalent nonlinear noise is generated based on zero-mean Chi-square distribution random variables combined with equivalent nonlinear noise spectrum filtering, and more accurate equivalent nonlinear noise than the related art is generated, thus accurately evaluating an influence of nonlinearity of devices on BER.

With reference to the following descriptions and drawings, the specific implementations of the present disclosure are disclosed in detail, and the ways in which the principle of the present disclosure can be adopted are pointed out. It should be understood that the implementations of the present disclosure are not limited thereby in scope. Within the scope of the clauses of the appended claims, the implementations of the present disclosure include many changes, modifications and equivalents.

The features described and/or illustrated for one implementation may be used in one or more other implementations in a same or similar way, and combined with or substituted for features in other implementations.

It should be emphasized that the term 'comprise/include' used herein refers to the presence of features, integers, steps or components, but does not exclude the presence or addition of one or more other features, integers, steps or components.

BRIEF DESCRIPTION OF THE DRAWINGS

The elements and features described in one drawing or implementation of the embodiments of the present disclosure may be combined with the elements and features illustrated in one or more other drawings or implementations. In addition, in the drawings, similar reference numerals indicate corresponding parts in several drawings, and can be used to indicate corresponding parts used in more than one implementation.

The drawings, which are included to provide a further understanding of the embodiments of the present disclosure, constitute a part of the specification, illustrate the implementations of the present disclosure, and explain the principle of the present disclosure together with the textual description. Obviously, the drawings described below only illustrate some embodiments of the present disclosure, and those of ordinary skill in the art can obtain any other drawing from them without paying any creative labor. In the drawings.

DETAILED DESCRIPTION

The foregoing and other features of the present disclosure will become apparent from the following description with reference to the drawings. In the description and drawings, particular embodiments of the present disclosure are specifically disclosed to represent some embodiments in which the principle of the present disclosure can be adopted. It should be understood that the present disclosure is not limited to the described embodiments, and on the contrary, the present disclosure includes all modifications, variations and equivalents that fall within the scope of the appended claims.

In the embodiments of the present disclosure, the terms 'first', 'second', etc. are used to distinguish different elements in terms of titles, but they do not mean a spatial arrangement or a time sequence of these elements, and these elements should not be limited by them. The term 'and/or' includes any one and all combinations of one or more of terms listed in association. The terms 'comprise', 'include', 'have', etc. refer to the presence of the stated features, elements, members, or components, but do not exclude the presence or addition of one or more other features, elements, members or components.

In the embodiments of the present disclosure, singular forms 'a', 'the', etc. include plural forms thereof, and should be broadly understood as 'a kind of' or 'a category of' rather than being limited to the meaning of 'one'. In addition, the term 'said' should be understood to include both singular and plural forms, unless otherwise specified in the context explicitly. In addition, the term 'according to' should be understood as 'at least partially according to . . . ' and the term 'based on' should be understood as 'at least partially based on . . . ', unless otherwise specified in the context explicitly.

Figure 1:
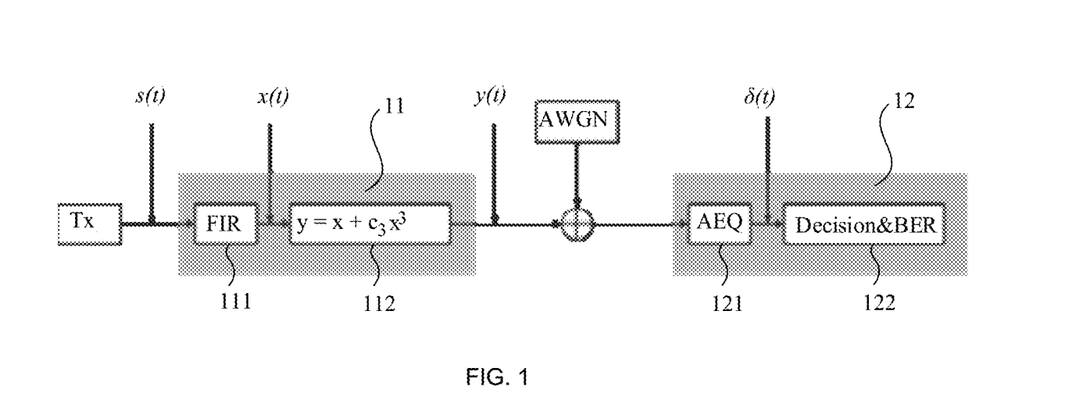
FIG. 1 is a schematic diagram of an electrical back-to-back transmission system.

FIG. 1 is a schematic diagram of a typical electric back-to-back transmission system. As illustrated in FIG. 1, a signal output from a transmitter (Tx) is interfered by an Additive White Gaussian Noise (AWGN) of a transmission link after passing through a nonlinear system 11, finally received by a receiver 12 and subjected to relevant signal processing to obtain a corresponding BER. The nonlinear system 11 is described by a classic Winner model, including a Finite Impulse Response (FIR) filter 111 and a memoryless polynomial 112 containing only a third-order nonlinear effect, i.e., $y=x+c_3 x^3 c_3$, where $c_3$ is a third-order nonlinear coefficient. The receiver 12 includes an Adaptive Equalizer (AEQ) 121, a decision and a BER calculation 122.

The signal passing through the FIR 111 may be expressed as $x(t)=s(t)+\delta(t)$, where $s(t)$ is an input signal of a nonlinear system and $\delta(t)$ is an Inter-symbol Interference (ISI) introduced by a memory effect of the FIR 111. Since ISI is a weighted sum of several symbols front and back, so it may be preliminarily deemed that $\delta(t)$ is approximate to a Gaussian distribution. In addition, as a memory length of the FIR 111 increases, the ISI becomes longer, and the distribution of $\delta(t)$ is closer to the Gaussian distribution.

In this way, the output signal of the nonlinear system 11 may be expressed as:

$$y(t)=x(t)+c_3 x^3(t)=s(t)+\delta(t)+c_3(s(t)+\delta(t))^3=s(t)+\delta(t)+c_3 s^3(t)+3c_3 s^2(t)\delta(t)+3c_3 s(t)\delta^2(t)+c_3\delta^3(t)$$

In the above formula, $c_3 s^3(t)$ denotes a gain compression item, $3c_3 s^2(t)\delta(t)$ denotes a correction of a linear ISI after an interaction between the ISI and nonlinearity. This correction is very similar to a correction of signal power by a gain compression, which shows that the frequency response of the whole system changes due to nonlinearity. $3c_3 s(t)\delta^2(t)+c_3\delta^3(t)$ may be regarded as an impairment caused by nonlinearity. Generally, the ISI is much less than the power of the signal itself, so $3c_3 s(t)\delta^2(t)+c_3\delta^3(t)$ $3c_3 s(t)\delta^2(t)$.

In consideration that $s(t)$ is the original input signal, a specific timing is selected, and assuming that a symbol sent at this timing is $s_0$, the above formula may be changed as follows through a Perturbation Theory:

$$y_0 \approx s_0+\delta+c_3 s_0^3+3c_3 s_0^2\delta+3c_3 s_0\delta^2$$

Due to the presence of the AEQ 121 of the receiver 12, it may be simply deemed that a gain compression amount $c_3 s_0^3$, the ISI (the original ISI $\delta$ and an ISI variation amount $3c_3 s_0^2\delta$ caused by nonlinearity) and the DC parts of $3c_3 s_0\delta^2$ will be eliminated by the AEQ. Therefore, after passing through the AEQ 121, an amount of distortion that influences the BER may be approximately attributed to the AC part of $3c_3 s_0\delta^2$, and it is a noise item that meets zero-mean Chi-square distribution.

It should be noted that the above derivation may abstract up to all the memory effects between the transmitter Tx and the memoryless polynomial 112 into a common filter, i.e., the FIR 111 in the Winner model, for simple processing. In addition, considering scenarios where nonlinearity is a dominant factor, the influence of AWGN on y(t) is ignored in the above derivation.

However, the actual ISI source is not limited to the nonlinear system itself. For example, the input signal is usually subjected to Nyquist Pulse Shaping in the transmitter, and the ISI will also be artificially introduced into the shaping filter.

Figure 2:
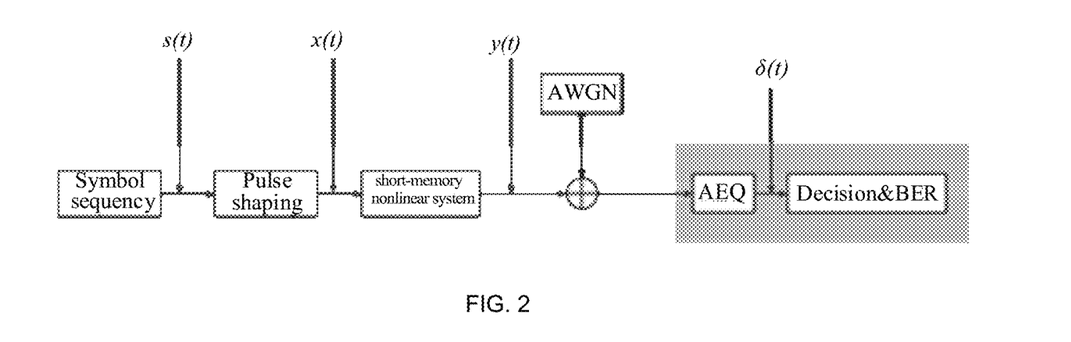
FIG. 2 is a schematic diagram of a short-memory nonlinear system transmission.

FIG. 2 is a schematic diagram of a short-memory nonlinear system transmission. As illustrated in FIG. 2, a memory effect of a nonlinear system itself is not strong, and no strong ISI will be introduced. However, the signal itself will generate a great ISI due to a shaping filter, and the introduced ISI becomes stronger as a roll-off coefficient decreases (e.g., 0.15 in practices). At this time, the amount of distortion that influences the BER of the equalized signal will also show the characteristics of zero-mean Chi-square distribution.

Based on the above theoretical derivation, the embodiments of the present disclosure propose a method of generating nonlinear equivalent noise by taking random noise meeting zero-mean Chi-square distribution as seed noise and performing coloring processing thereon using a Nonlinear NPR (NPR) filter.

Various implementations of the embodiments of the present disclosure are described below with reference to the drawings.

Embodiments of a First Aspect

The embodiments of the present disclosure provide a method for generating equivalent nonlinear noise. The method is applied to a to-be-measured nonlinear system in which a significant ISI exists, but the present disclosure is not limited thereto.

Figure 3:
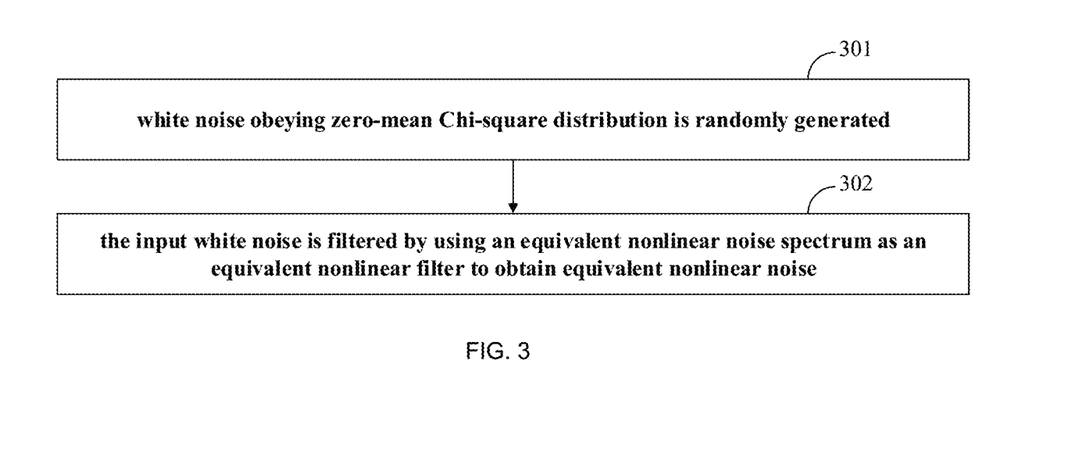
FIG. 3 is a schematic diagram of a method for generating equivalent nonlinear noise according to an embodiment of the present disclosure.

FIG. 3 is a schematic diagram of a method for generating equivalent nonlinear noise according to an embodiment of the present disclosure. As illustrated in FIG. 3, the method includes:
  301: white noise obeying zero-mean Chi-square distribution is randomly generated; and
  302: the input white noise is filtered by using an equivalent nonlinear noise spectrum as an equivalent nonlinear filter to obtain equivalent nonlinear noise.

According to the embodiment of the present disclosure, random variables of Chi-square distribution are taken as noise, and filtered by using an equivalent nonlinear noise spectrum, so that more accurate equivalent nonlinear noise can be generated. The system performance can be evaluated by using the equivalent nonlinear noise, and then the influence of nonlinearity of devices on BER can be evaluated.

In 301, it is possible to randomly generate a group of white noise obeying zero-mean Chi-square distribution which may be either positive skewness or negative skewness.

For example, it is possible to generate a group of random variables K of Chi-square distribution, and then subtract a mean value thereof from the random variables K to obtain the random noise (white noise) obeying zero-mean Chi-square distribution. That is, K'=K−mean(K), where mean represents an averaging operation.

For another example, it is possible to generate a group of random variables K of Chi-square distribution, and then subtract the random variables K from a mean value thereof to obtain the random noise (white noise) obeying zero-mean Chi-square distribution. That is, K'=mean(K)−K.

In the above embodiment, the method of generating the random variables K of Chi-square distribution is not limited, and it is possible to adopt an Acceptance-Rejection Sampling method, an inverse function method based on a Cumulative Distribution Function, and any other method for generating random variables meeting a requirement on specific probability distribution.

In 302, the equivalent nonlinear noise spectrum may be used as an equivalent nonlinear filter to filter the input white noise obeying Chi-square distribution, and the filtered signal is the generated equivalent nonlinear noise.

In the above embodiment, the equivalent nonlinear noise spectrum may be obtained by using an existing nonlinear Noise Power Ratio (NPR) measurement method based on a notched test signal, or by using other related technologies, which is not limited by the present disclosure.

The embodiments of the present disclosure further provide a method for generating equivalent nonlinear complex noise.

In the embodiments of the present disclosure, when the input signal (the transmitted signal) of the to-be-measured system is a complex signal, equivalent nonlinear complex noise may also be generated by using the method according to the embodiments of the present disclosure to evaluate the system performance of the to-be-measured system. For example, for a coherent optical communication system, a signal transmitted in a single polarization state includes an I-branch and a Q-branch, and signals of the above two branches will be interfered by the nonlinearity of devices, so that the actual nonlinear noise will appear in the form of complex noise. The method according to the embodiments of the present disclosure can emulate the equivalent nonlinear noise in a complex form, thus effectively evaluating the influence of nonlinearity on the performance of related optical communication system.

The method for generating equivalent nonlinear complex noise according to the embodiments of the present disclosure will be described below.

Figure 4A:
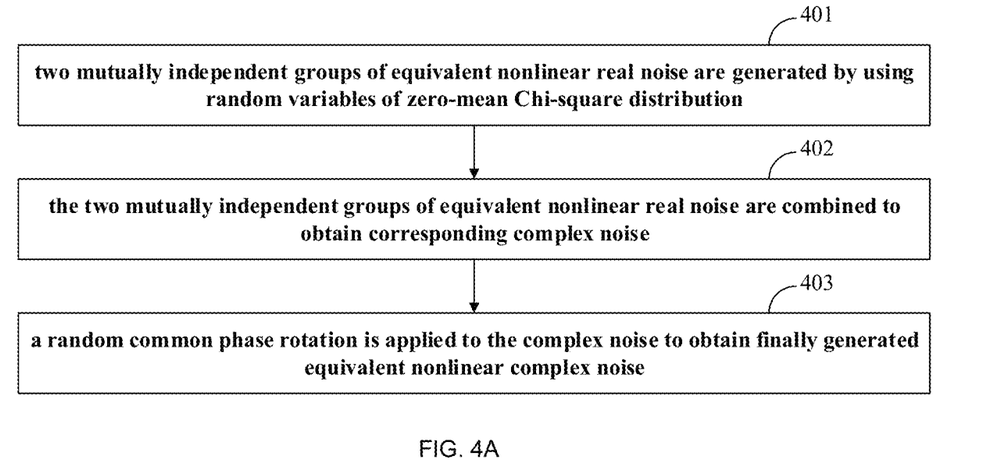
FIG. 4A is a schematic diagram of a method for generating equivalent nonlinear complex noise according to an embodiment of the present disclosure.

FIG. 4A is a schematic diagram of a method for generating equivalent nonlinear complex noise according to an embodiment of the present disclosure. As illustrated in FIG. 4A, the method includes:
  401: two mutually independent groups of equivalent nonlinear real noise are generated by using random variables of zero-mean Chi-square distribution;
  402: the two mutually independent groups of equivalent nonlinear real noise are combined to obtain corresponding complex noise;
  403: a random common phase rotation is applied to the complex noise to obtain finally generated equivalent nonlinear complex noise.

In 401, the above two groups of equivalent nonlinear real noise may be generated by using the method according to the embodiment of FIG. 3. The specific method for generating has been described previously, the content of which is incorporated here and will not be repeated. In 402, the corresponding complex noise may be obtained by combining the generated two groups of equivalent nonlinear real noise. In 403, the equivalent nonlinear complex noise can be obtained by applying a random common phase rotation to the complex noise.

Figure 4B:
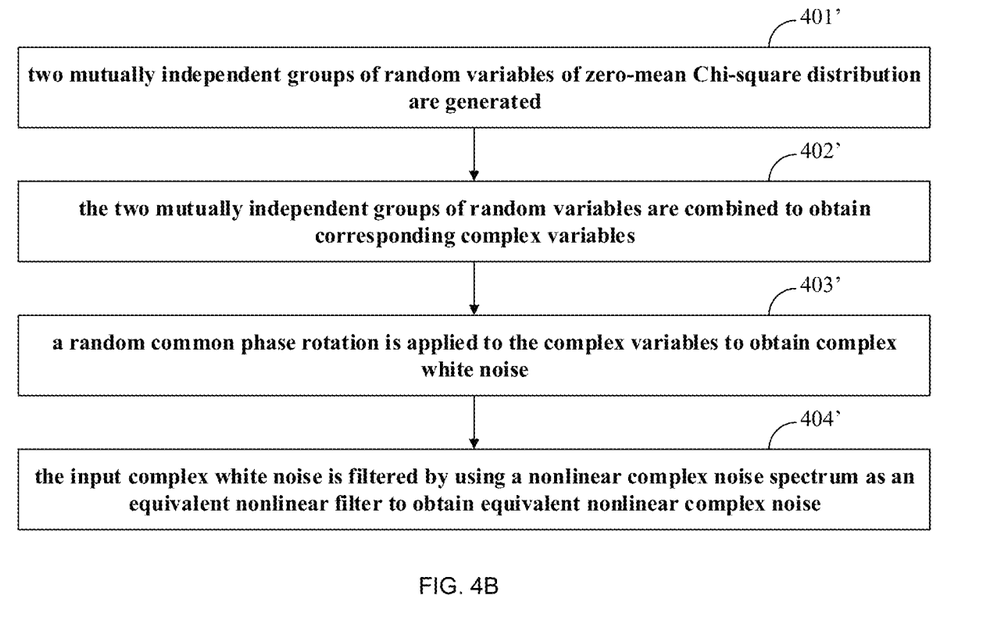
FIG. 4B is another schematic diagram of a method for generating equivalent nonlinear complex noise according to an embodiment of the present disclosure.

FIG. 4B is another schematic diagram of a method for generating equivalent nonlinear complex noise according to an embodiment of the present disclosure. As illustrated in FIG. 4B, the method includes:

401': two mutually independent groups of random variables of zero-mean Chi-square distribution are generated;

402': the two mutually independent groups of random variables are combined to obtain corresponding complex variables;

403': a random common phase rotation is applied to the complex variables to obtain complex white noise;

404': the input complex white noise is filtered by using a nonlinear complex noise spectrum as an equivalent nonlinear filter to obtain equivalent nonlinear complex noise.

In the above embodiment, for an optical communication system, if a spectrometer is adopted behind the transmitter in order to measure the nonlinear noise power ratio (NPR), the nonlinear noise spectrum obtained by direct measurement is a sum of nonlinear power spectra in the signals of the I-branch and the Q-branch, that is, a power spectrum of the nonlinear complex noise, which is called as a nonlinear complex noise spectrum in the embodiments of the present disclosure.

In 401', the two groups of random variables of zero-mean Chi-square distribution (i.e., noise) can be generated by using the method according to the embodiment of FIG. 3. The specific method for generating has been described previously, the content of which is incorporated here and will not be repeated. In 402', the corresponding complex variables can be obtained by combining the two groups of random variables. In 403', the complex white noise can be obtained by applying a random common phase rotation to the complex variables. In 404', the equivalent nonlinear complex noise can be obtained by using the nonlinear complex noise spectrum to filter the complex white noise.

Figure 5A:
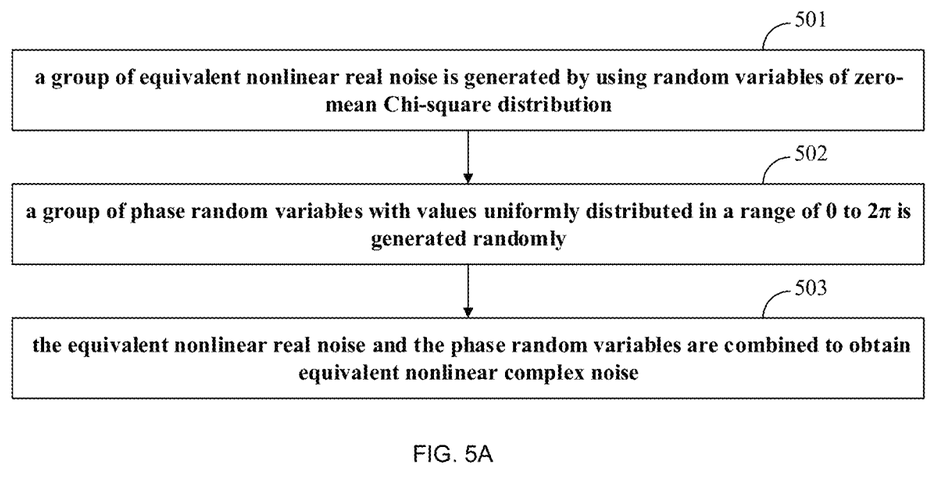
FIG. 5A is still another schematic diagram of a method for generating equivalent nonlinear complex noise according to an embodiment of the present disclosure.

FIG. 5A is still another schematic diagram of a method for generating equivalent nonlinear complex noise according to an embodiment of the present disclosure. As illustrated in FIG. 5A, the method includes:

501: a group of equivalent nonlinear real noise is generated by using random variables of zero-mean Chi-square distribution, the equivalent nonlinear real noise being corresponding to an amplitude of target complex nonlinear noise;

502: a group of phase random variables with values uniformly distributed in a range of 0 to $2\pi$ is generated randomly, the phase random variables being corresponding to a phase of the target complex nonlinear noise;

503: the equivalent nonlinear real noise and the phase random variables are combined to obtain equivalent nonlinear complex noise (the target complex nonlinear noise).

In the above embodiment, assuming that an amplitude variable is $\vec{A}$ and a phase variable is $\vec{P}$, the generated complex noise may be expressed as $\text{Noise}_{E-NL} = \vec{A}\exp(j*\vec{P})$. For a nonlinear system having a complex signal as an input signal, such as a power amplifier, its nonlinear noise is influenced by an amplitude and a phase of the input signal, so this manner can better emulate the real nonlinear noise.

In 501, the equivalent nonlinear real noise may be generated by using the method according to the embodiment of FIG. 3. The specific method for generating has been described previously, the content of which is incorporated here and will not be repeated. The equivalent nonlinear real noise may be used as the amplitude of the target complex nonlinear noise. In 502, a group of phase random variables are generated as the phases of the target complex nonlinear noise. In 503, the target complex nonlinear noise, that is, the equivalent nonlinear complex noise, is obtained by combining the equivalent nonlinear real noise and the phase random variables.

Figure 5B:
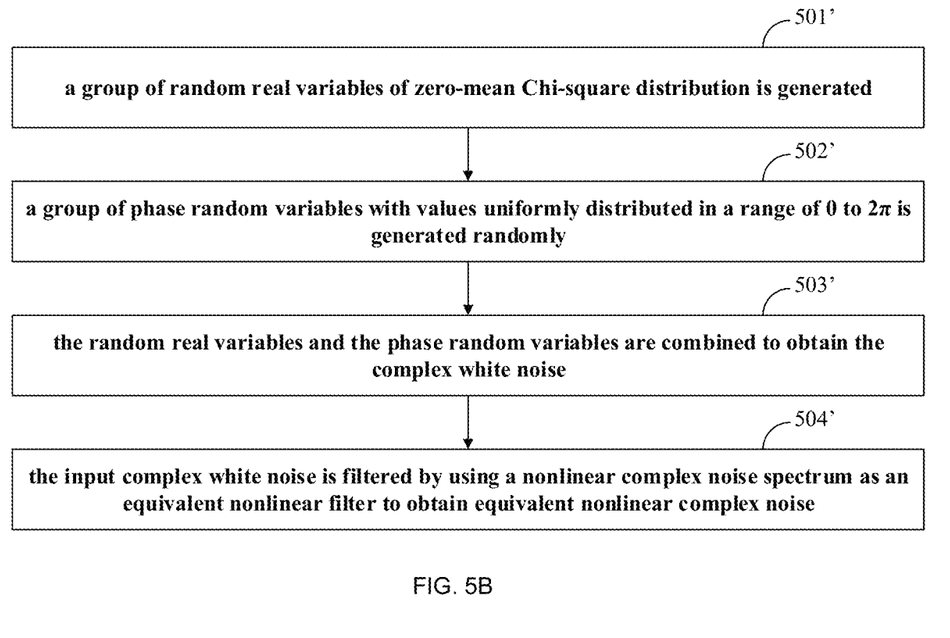
FIG. 5B is yet another schematic diagram of a method for generating equivalent nonlinear complex noise according to an embodiment of the present disclosure.

FIG. 5B is yet another schematic diagram of a method for generating equivalent nonlinear complex noise according to an embodiment of the present disclosure. As illustrated in FIG. 5B, the method includes:

501': a group of random real variables of zero-mean Chi-square distribution is generated, the random real variables being corresponding to an amplitude of complex white noise;

502': a group of phase random variables with values uniformly distributed in a range of 0 to $2\pi$ is generated randomly, the phase random variables being corresponding to a phase of the complex white noise;

503': the random real variables and the phase random variables are combined to obtain the complex white noise;

504': the input complex white noise is filtered by using a nonlinear complex noise spectrum as an equivalent nonlinear filter to obtain equivalent nonlinear complex noise.

In the above embodiment, the concept of the nonlinear complex noise spectrum has been described previously and will not be repeated here.

In 501', the random real variables (i.e., noise) of zero-mean Chi-square distribution may be generated by using the method according to the embodiment of FIG. 3. The specific method for generating has been described previously, the content of which is incorporated here and will not be repeated. The random real variable may be used as the amplitude of the complex white noise. In 502', a group of phase random variables are generated as the phases of the complex white noise. In 503', complex white noise is obtained by combining the random real variables and the phase random variables. In 504', a nonlinear complex noise spectrum is used to filter the complex white noise to obtain the equivalent nonlinear complex noise.

In the method according to the embodiments of the present disclosure, when a to-be-measured system has a significant ISI, random noise of zero-mean Chi-square distribution can be used in combination with equivalent nonlinear noise spectrum filtering to generate equivalent nonlinear noise/equivalent nonlinear complex noise, for a nonlinear BER cost evaluation.

Embodiments of a Second Aspect

The embodiments of the present disclosure provide a method for evaluating system performance, the method being applicable to a to-be-measured system that requires a system performance evaluation.

Figure 6:
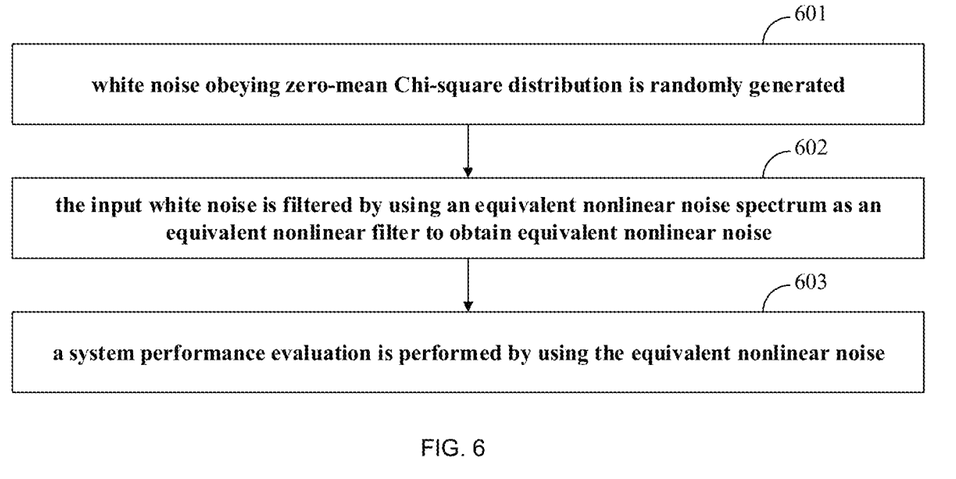
FIG. 6 is a schematic diagram of a method for evaluating system performance according to an embodiment of the present disclosure.

FIG. 6 is a schematic diagram of a method for evaluating system performance according to an embodiment of the present disclosure. As illustrated in FIG. 6, the method includes:

601: white noise obeying zero-mean Chi-square distribution is randomly generated;

602: the input white noise is filtered by using an equivalent nonlinear noise spectrum as an equivalent nonlinear filter to obtain equivalent nonlinear noise;

603: a system performance evaluation is performed by using the equivalent nonlinear noise.

In the above embodiment, the processing of 601 and 602 are the same as those of 301 and 302 in the embodiments of the first aspect, the contents of which are incorporated here and will not be repeated.

In 603, the system performance evaluation can be performed by using the equivalent nonlinear noise obtained in 602. The specific method for evaluating is not limited in the present disclosure, and please refer to the related arts.

Figure 7:
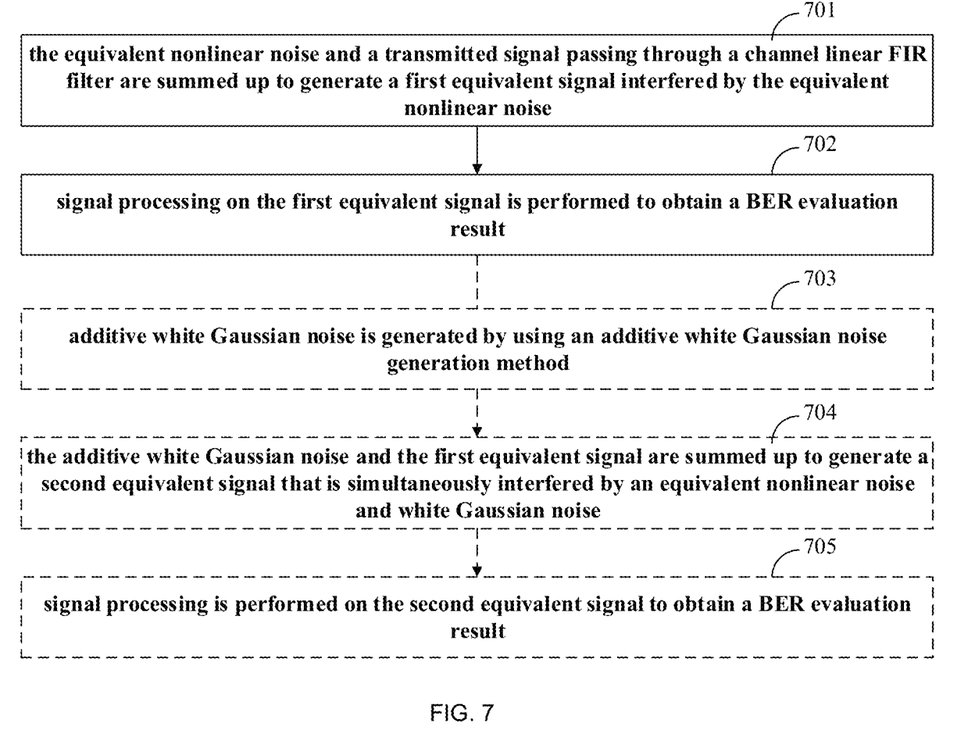
FIG. 7 is a schematic diagram of an example of step 503 in the method of FIG. 6.

FIG. 7 is a schematic diagram of a method for evaluating a nonlinear bit error rate (BER) cost by using the equivalent nonlinear noise obtained in 602. As illustrated in FIG. 7, the method includes:

701: the equivalent nonlinear noise and a transmitted signal passing through a channel linear FIR filter are summed up to generate a first equivalent signal interfered by the equivalent nonlinear noise; and

702: signal processing on the first equivalent signal (an emulated signal or a simulated signal) is performed to obtain a BER evaluation result.

In the above embodiment, a receive signal that is interfered by actual nonlinearity is emulated through the first equivalent signal, and the obtained BER evaluation result reflects a BER cost caused by nonlinearity.

In some embodiments, as illustrated in FIG. 7, the method further includes:

703: additive white Gaussian noise is generated by using an additive white Gaussian noise generation method;

704: the additive white Gaussian noise and the first equivalent signal are summed up to generate a second equivalent signal that is simultaneously interfered by an equivalent nonlinear noise and white Gaussian noise; and

705: signal processing is performed on the second equivalent signal to obtain a BER evaluation result.

In the above embodiment, a receive signal that is simultaneously interfered by the equivalent nonlinear noise and the white Gaussian noise is emulated through the second equivalent signal, and the obtained BER evaluation result reflects the BER cost caused by nonlinearity under a background condition of certain white Gaussian noise.

It should be noted that FIG. 7 only exemplarily illustrates the embodiment of the present disclosure, and the present disclosure is not limited thereto. For example, the execution order of the steps may be appropriately adjusted, and some other steps may be added or some of the existing steps may be reduced. Those skilled in the art can make appropriate modifications according to the above content, without being limited to the illustration of FIG. 7. For example, there is no inheritance relationship between 702 and 703, and 702 is not necessarily performed before 703. In some embodiments, 702 may be omitted, and in some embodiments, the processing of 702 may be combined into 705, and so on.

Figure 8:
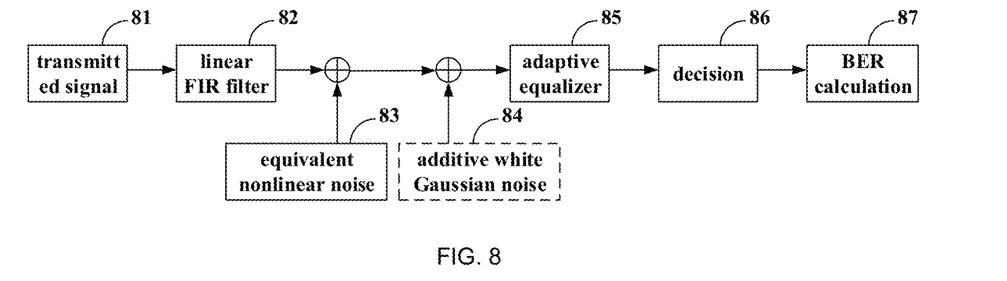
FIG. 8 is a schematic diagram of an example of a nonlinear BER cost evaluation according to an embodiment of the present disclosure.

FIG. 8 is a schematic diagram of an example of a nonlinear BER cost evaluation according to an embodiment of the present disclosure.

As illustrated in FIG. 8, nonlinear noise received by a transmitted signal 81 after passing through a linear FIR filter 82 of the whole channel is emulated by equivalent nonlinear noise 83, and channel linear noise received is emulated by additive white Gaussian noise 84. The final BER evaluation result is obtained by subsequent signal processing, including but not limited to an adaptive equalizer 85, a decision 86 and a BER calculation 87.

In the above embodiment, a module that generates the additive white Gaussian noise 84 may be turned off or on. When the module is turned off, the obtained BER result may represent a transmission cost simply caused by the system nonlinearity. When the module is turned on, the obtained BER results may represent a transmission cost caused by the system nonlinearity in the presence of certain background noise.

In the method according to the embodiments of the present disclosure, when a to-be-measured system has a significant ISI, random noise of zero-mean Chi-square distribution can be used in combination with equivalent nonlinear noise spectrum filtering to generate equivalent nonlinear noise/equivalent nonlinear complex noise, for a nonlinear BER cost evaluation.

Embodiments of a Third Aspect

The embodiments of the present disclosure provide an apparatus for generating equivalent nonlinear noise. Since the principle of this apparatus for solving problems is similar to that of the method according to the embodiments of the first aspect, its specific implementations may refer to those of the method according to the embodiments of the first aspect, and the same content will not be repeated.

Figure 9:
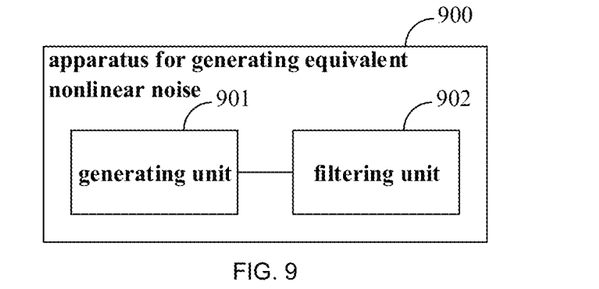
FIG. 9 is a schematic diagram of an apparatus for generating equivalent nonlinear noise according to an embodiment of the present disclosure.

FIG. 9 is a schematic diagram of an apparatus for generating equivalent nonlinear noise according to an embodiment of the present disclosure. As illustrated in FIG. 9, the apparatus 900 includes: a generating unit 901 configured to randomly generate white noise obeying zero-mean Chi-square distribution; and a filtering unit 902 configured to filter the input white noise by using an equivalent nonlinear noise spectrum as an equivalent nonlinear filter to obtain equivalent nonlinear noise.

In some embodiments, the generating unit 901 that randomly generates white noise obeying zero-mean Chi-square distribution includes: generating a group of random variables K of Chi-square distribution; and subtracting a mean value thereof from the random variables K to obtain the white noise.

In some embodiments, the generating unit 901 that randomly generates white noise obeying zero-mean Chi-square distribution includes: generating a group of random variables K of Chi-square distribution; and subtracting the random variables K from a mean value thereof to obtain the white noise.

In the above embodiment, the generating unit 901 that generates the random variables K of Chi-square distribution by using one of the following methods: an acceptance-rejection sampling method, an inverse function method based on a cumulative distribution function, and a method for generating a random variable meeting a requirement on specific probability distribution.

In some embodiments, the equivalent nonlinear noise spectrum is obtained by using a nonlinear noise power ratio measurement method based on a notched test signal.

In the embodiments of the present disclosure, the apparatus is configured in a to-be-measured nonlinear system in which a significant ISI exists.

Figure 10A:
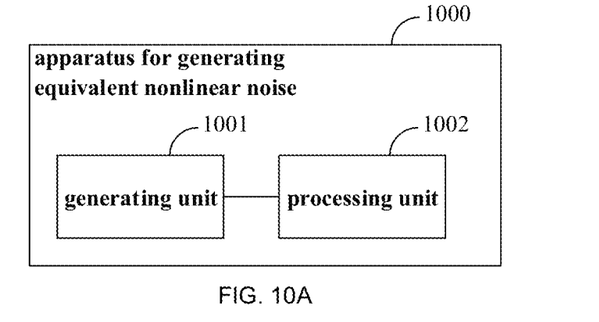
FIGS. 10A and 10B are another two schematic diagrams of an apparatus for generating equivalent nonlinear noise according to embodiments of the present disclosure.

FIG. 10A is a schematic diagram of an apparatus for generating equivalent nonlinear complex noise according to an embodiment of the present disclosure. As illustrated in FIG. 10A, the apparatus 1000 includes: a generating unit 1001 configured to generate two mutually independent groups of equivalent nonlinear real noise by using random variables of zero-mean Chi-square distribution; and a processing unit 1002 configured to combine the two mutually independent groups of equivalent nonlinear real noise to obtain corresponding complex noise, and apply a random common phase rotation to the complex noise to obtain finally generated equivalent nonlinear complex noise.

Figure 10B:
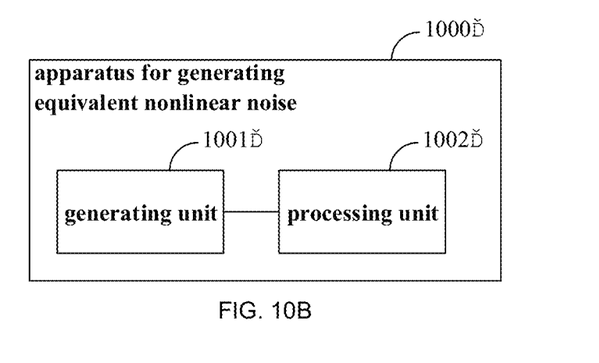

FIG. 10B is another schematic diagram of an apparatus for generating equivalent nonlinear complex noise according to an embodiment of the present disclosure. As illustrated in FIG. 10B, the apparatus 1000' includes: a generating unit 1001' configured to generate two mutually independent groups of random variables of zero-mean Chi-square distribution; and a processing unit 1002' configured to combine the two mutually independent groups of random variables to obtain corresponding complex variables, apply a random common phase rotation to the complex variables to obtain complex white noise, and filter the input complex white noise by using a nonlinear complex noise spectrum as an equivalent nonlinear filter to obtain equivalent nonlinear complex noise.

In the above embodiment, the generating unit 1001 and the generating unit 1001' may be implemented by the apparatus for generating equivalent nonlinear noise as illustrated in FIG. 9.

Figure 11A:
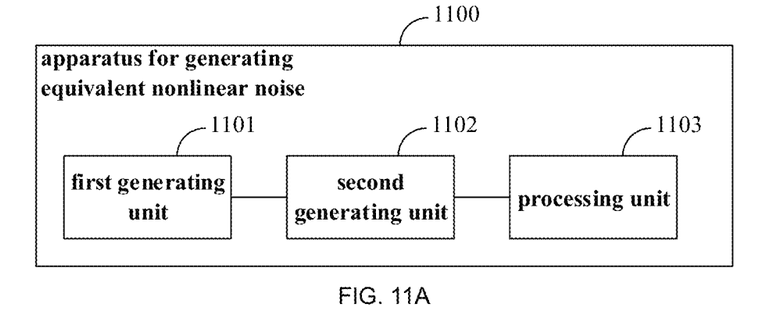
FIGS. 11A and 11B are still another two schematic diagrams of an apparatus for generating equivalent nonlinear noise according to embodiments of the present disclosure.

FIG. 11A is still another schematic diagram of an apparatus for generating equivalent nonlinear noise according to an embodiment of the present disclosure. As illustrated in FIG. 11A, the apparatus 1100 includes: a first generating unit 1101 configured to generate a group of equivalent nonlinear real noise by using random variables of zero-mean Chi-square distribution, the equivalent nonlinear real noise being corresponding to an amplitude of target complex nonlinear noise; a second generating unit 1102 configured to randomly generate a group of phase random variables with values uniformly distributed in a range of 0 to 2π, the phase random variables being corresponding to a phase of the target complex nonlinear noise; and a processing unit 1103 configured to combine the equivalent nonlinear real noise and the phase random variables to obtain equivalent nonlinear complex noise (the target complex nonlinear noise).

Figure 11B:
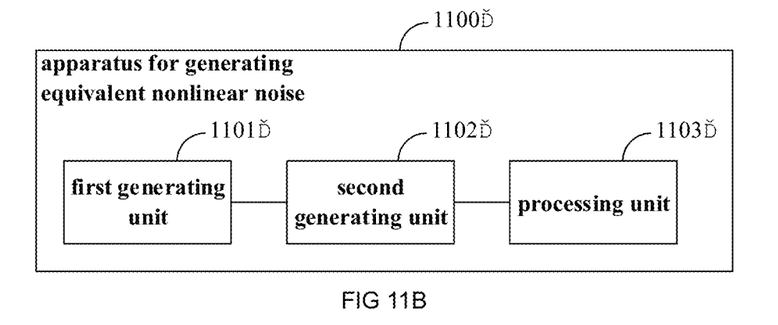

FIG. 11B is yet another schematic diagram of an apparatus for generating equivalent nonlinear noise according to an embodiment of the present disclosure. As illustrated in FIG. 11B, the apparatus 1100' includes: a first generating unit 1101' configured to generate a group of random real variables of zero-mean Chi-square distribution, the random real variables being corresponding to an amplitude of complex white noise; a second generating unit 1102' configured to randomly generate a group of phase random variables with values uniformly distributed in a range of 0 to 2π, the phase random variables being corresponding to a phase of the complex white noise; and a processing unit 1103' configured to combine the random real variables and the phase random variables to obtain the complex white noise, and filter the input complex white noise by using a nonlinear complex noise spectrum as an equivalent nonlinear filter to obtain equivalent nonlinear complex noise.

In the above embodiment, the first generating unit 1101 and the first generating unit 1101' may be implemented by the apparatus for generating equivalent nonlinear noise as illustrated in FIG. 9.

In the apparatus according to the embodiments of the present disclosure, when a to-be-measured system has a significant ISI, random noise of zero-mean Chi-square distribution can be used in combination with equivalent nonlinear noise spectrum filtering to generate equivalent nonlinear noise/equivalent nonlinear complex noise, for a nonlinear BER cost evaluation.

Embodiments of a Fourth Aspect

The embodiments of the present disclosure provide an apparatus for evaluating system performance. Since the principle of this apparatus for solving problems is similar to that of the method according to the embodiments of the second aspect, its specific implementations may refer to those of the method according to the embodiments of the second aspect, and the same content will not be repeated.

Figure 12:
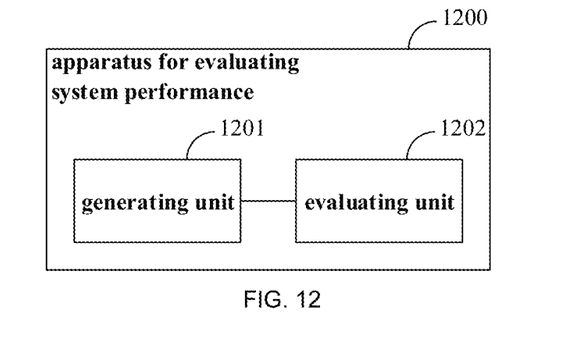
FIG. 12 is a schematic diagram of an apparatus for evaluating system performance according to an embodiment of the present disclosure.

FIG. 12 is a schematic diagram of an apparatus for evaluating system performance according to an embodiment of the present disclosure. As illustrated in FIG. 12, the apparatus 1200 includes: a generating unit 1201 configured to randomly generate white noise obeying zero-mean Chi-square distribution, and filtering the input white noise by using an equivalent nonlinear noise spectrum as an equivalent nonlinear filter to obtain equivalent nonlinear noise; and an evaluating unit 1202 configured to perform system performance evaluation by using the equivalent nonlinear noise.

In some embodiments, the evaluating unit 1202 performs system performance evaluation by using the equivalent nonlinear noise includes: summing up the equivalent nonlinear noise and a transmitted signal passing through a channel linear FIR filter to generate a first equivalent signal interfered by the equivalent nonlinear noise, the first equivalent signal emulating a receive signal interfered by actual nonlinearity; and performing signal processing on the first equivalent signal to obtain a bit error rate evaluation result which reflects a bit error rate cost caused by nonlinearity.

In some embodiments, the evaluating unit 1202 performs system performance evaluation by using the equivalent nonlinear noise further includes: generating additive white Gaussian noise by using an additive white Gaussian noise generation method; summing up the additive white Gaussian noise and the first equivalent signal to generate a second equivalent signal that is simultaneously interfered by an equivalent nonlinear noise and white Gaussian noise, the second equivalent signal emulating a receive signal simultaneously interfered by the equivalent nonlinear noise and the white Gaussian noise; performing signal processing on the second equivalent signal to obtain a bit error rate evaluation result which reflects a bit error rate cost caused by nonlinearity under a background condition of certain white Gaussian noise.

In the apparatus according to the embodiments of the present disclosure, when a to-be-measured system has a significant ISI, random noise of zero-mean Chi-square distribution can be used in combination with equivalent nonlinear noise spectrum filtering to generate equivalent nonlinear noise/equivalent nonlinear complex noise, for a nonlinear BER cost evaluation.

Embodiments of a Fifth Aspect

The embodiments of the present disclosure provide an optical communication system.

In some embodiments, the optical communication system includes an apparatus for generating equivalent nonlinear noise according to the embodiments of the third aspect, and configured to perform the method for generating equivalent nonlinear noise/equivalent nonlinear complex noise according to the embodiments of the first aspect. Since the method for generating equivalent nonlinear noise/equivalent nonlinear complex noise has been described in the embodiments of the first aspect, the description thereof is omitted here.

In some embodiments, the optical communication system includes an apparatus for evaluating system performance according to the embodiments of the fourth aspect, and configured to perform the method for evaluating system performance according to the embodiments of the second aspect. Since the method for evaluating system performance has been described in the embodiments of the second and fourth aspects, the description thereof is omitted here.

In the embodiments of the present disclosure, the optical communication system further includes other devices, such as a channel linear FIR at the side of an optical transmitter, an adaptive equalizer at the side of an optical receiver, a decider, a BER calculating module, a signal processing module, etc. Please refer to the related arts for detail, and the description is omitted here.

The embodiments of the present disclosure further provide a computer-readable program, wherein when being executed in an apparatus for generating equivalent nonlinear noise, the program causes the apparatus for generating equivalent nonlinear noise to perform the method according to the embodiments of the first aspect.

The embodiments of the present disclosure provide a storage medium in which a computer-readable program is stored, wherein the computer-readable program causes an apparatus for generating equivalent nonlinear noise to perform the method according to the embodiments of the first aspect.

The embodiments of the present disclosure further provide a computer-readable program, wherein when being executed in an apparatus for evaluating system performance, the program causes the apparatus for evaluating system performance to perform the method according to the embodiments of the second aspect.

The embodiments of the present disclosure provide a storage medium in which a computer-readable program is stored, wherein the computer-readable program causes an apparatus for evaluating system performance to perform the method according to the embodiments of the second aspect.

The above devices and methods of the present disclosure may be implemented by hardware or a combination of hardware and software. The present disclosure relates to a computer-readable program which, when being executed by a logic unit, enables the logic unit to implement the above devices or constituent parts, or enables the logic unit to implement the above methods or steps. The present disclosure also relates to a storage media storing the above program, such as a hard disk, a magnetic disk, an optical disk, a DVD, a flash memory, etc.

The methods/devices described in conjunction with the embodiments of the present disclosure may be directly embodied as hardware, a software module executed by a processor, or a combination thereof. For example, one or more of the functional block diagrams illustrated in the drawings and/or one or more combinations of the functional block diagrams may correspond to either respective software modules or respective hardware modules of a computer program flow. The software modules may respectively correspond to the steps illustrated in the drawings. The hardware modules for example may be implemented by solidifying the software modules with a field programmable gate array (FPGA).

The software module may be located in an RAM memory, a flash memory, an ROM memory, an EPROM memory, an EEPROM memory, a register, a hard disk, a removable disk, a CD-ROM or any other form of storage medium known in the art. A storage medium may be coupled to a processor, so that the processor can read information from and write information to the storage medium. Or, the storage medium may be a constituent part of the processor. The processor and the storage medium may be in an ASIC. The software module may be stored in a memory of a mobile terminal, or in a memory card insertable into the mobile terminal. For example, if a device (such as a mobile terminal) adopts a large-capacity MEGA-SIM card or a large-capacity flash memory device, the software module may be stored in the large-capacity MEGA-SIM card or the large-capacity flash memory device.

One or more of the functional blocks described in the drawings and/or one or more combinations of the functional blocks may be implemented as a general-purpose processor, a digital signal processor (DSP), an application specific integrated circuit (ASIC), a field programmable gate array (FPGA) or any other programmable logic device, discrete gates or transistor logic devices, discrete hardware components or any suitable combination thereof, for performing the functions described in the present disclosure. One or more of the functional blocks described in the drawings and/or one or more combinations of the functional blocks may further be realized as a combination of computing devices, such as a combination of a DSP and a microprocessor, a plurality of microprocessors, one or more microprocessors in communication with the DSP, or any other such configuration.

The present disclosure has been described above in conjunction with the specific implementations, but those skilled in the art should understand that these descriptions are exemplary rather than limiting the protection scope of the present disclosure. Those skilled in the art can make various variations and modifications to the present disclosure according to the spirit and principle of the present disclosure, and these variations and modifications should also fall within the scope of the present disclosure.

Regarding the implementations including the above embodiments, the following example supplements are further disclosed:

In an example, a method for generating equivalent nonlinear noise may include a randomly generating white noise obeying zero-mean Chi-square distribution; and filtering the input white noise by using an equivalent nonlinear noise spectrum as an equivalent nonlinear filter to obtain equivalent nonlinear noise.

The randomly generating white noise obeying zero-mean Chi-square distribution may include generating a group of random variables K of Chi-square distribution; and subtracting a mean value thereof from the random variables K to obtain the white noise.

The randomly generating white noise obeying zero-mean Chi-square distribution may include generating a group of random variables K of Chi-square distribution; and subtracting the random variables K from a mean value thereof to obtain the white noise.

The random variables K of Chi-square distribution are generated by using one of the following methods: an acceptance-rejection sampling method, an inverse function method based on a cumulative distribution function, and a method for generating a random variable meeting a requirement on specific probability distribution.

The equivalent nonlinear noise spectrum is obtained by using a nonlinear noise power ratio measurement method based on a notched test signal.

The method be configured in a to-be-measured nonlinear system in which a significant ISI exists.

In an example, a method for evaluating system performance, may include generating equivalent nonlinear noise by using the method according to any one of supplements 1 to 6; and performing system performance evaluation by using the equivalent nonlinear noise.

The performing system performance evaluation by using the equivalent nonlinear noise may include summing up the equivalent nonlinear noise and a transmitted signal passing through a channel linear FIR filter to generate a first equivalent signal interfered by the equivalent nonlinear noise; and performing signal processing on the first equivalent signal to obtain a BER evaluation result.

The performing system performance evaluation by using the equivalent nonlinear noise may include generating additive white Gaussian noise by using an additive white Gaussian noise generation method; summing up the additive white Gaussian noise and the first equivalent signal to generate a second equivalent signal that is simultaneously interfered by an equivalent nonlinear noise and white Gaussian noise; and performing signal processing on the second equivalent signal to obtain a BER evaluation result.

In an example, a method for generating equivalent nonlinear complex noise, may include generating two mutually independent groups of equivalent nonlinear real noise by using the method according to any one of the methods described above to generate equivalent nonlinear noise; combining the two mutually independent groups of equivalent nonlinear real noise to obtain corresponding complex noise; and applying a random common phase rotation to the complex noise to obtain equivalent nonlinear complex noise.

A method for generating equivalent nonlinear complex noise, may include generating two mutually independent groups of random variables of zero-mean Chi-square distribution by using the method according to any one of the methods described above to generate equivalent nonlinear noise; combining the two mutually independent groups of random variable to obtain corresponding complex variables; applying a random common phase rotation to the complex variables to obtain complex white noise; and filtering the input complex white noise by using a nonlinear complex noise spectrum as an equivalent nonlinear filter to obtain equivalent nonlinear complex noise.

A method for generating equivalent nonlinear complex noise, may include generating a group of equivalent nonlinear real noise by using the method according to any one of the methods described above to generate equivalent nonlinear noise, the equivalent nonlinear real noise being corresponding to an amplitude of target complex noise; randomly generating a group of phase random variables with values uniformly distributed in a range of 0 to $2\pi$, the phase random variables being corresponding to a phase of the target complex noise; and combining the equivalent nonlinear real noise and the phase random variables to obtain equivalent nonlinear complex noise (the target complex noise).

A method for generating equivalent nonlinear complex noise, may include generating a group of random real variables of zero-mean Chi-square distribution by using the method according to any one of methods described above to generate equivalent nonlinear noise; randomly generating a group of phase random variables with values uniformly distributed in a range of 0 to $2\pi$; combining the random real variables and the phase random variables to obtain complex white noise; and filtering the input complex white noise by using a nonlinear complex noise spectrum as an equivalent nonlinear filter to obtain equivalent nonlinear complex noise.

An optical communication system, including an apparatus for generating equivalent nonlinear noise and configured to perform the method according to any one of the methods described above to generate equivalent nonlinear noise and the method described above to generate equivalent nonlinear complex noise.

An optical communication system, including an apparatus for evaluating system performance to perform the method according to any one of the methods described above to evaluate performance of a system.

The invention claimed is:

1. An apparatus comprising:
a memory; and
a processor coupled to the memory, the processor to control execution of a process including,
  randomly generating a white noise obeying zero-mean Chi-square distribution; and
  filtering the white noise by using a spectrum of equivalent nonlinear noise as a filter to obtain an equivalent nonlinear noise,
wherein
  the process to randomly generate the white noise comprises:
    generating a group of Chi-square distribution random variables K; and
    subtracting a mean value of the random variables K from the random variables K to obtain the white noise,
  or
  the process to randomly generate the white noise comprises:
    generating a group of Chi-square distribution random variables K; and
    subtracting the random variables K from a mean value of the random variables K to obtain the white noise.

2. The apparatus according to claim 1, wherein the process to generate the group of Chi-square distribution random variables K includes using at least one method among methods of:
  an acceptance-rejection sampling method,
  an inverse function method based on a cumulative distribution function, and
  a method for generating a random variable meeting a requirement on specific probability distribution.

3. The apparatus according to claim 1, wherein the spectrum of equivalent nonlinear noise is obtained by using a nonlinear noise power ratio measurement method based on a notched test signal.

4. The apparatus according to claim 1, wherein the apparatus is configured in a to-be-measured nonlinear system in which significant Inter-symbol Interference (ISI) exists.

5. The apparatus according to claim 4, wherein the process to generate the group of Chi-square distribution random variables K includes using at least one method among methods of:
  an acceptance-rejection sampling method,
  an inverse function method based on a cumulative distribution function, and
  a method for generating a random variable meeting a requirement on specific probability distribution.

6. An apparatus comprising:
a memory; and
a processor coupled to the memory, the processor to control execution of a process including,
  randomly generating a white noise obeying zero-mean Chi-square distribution;
  filtering the white noise by using a spectrum of equivalent nonlinear noise as a filter to obtain an equivalent nonlinear noise; and
  evaluating performance of a system using the equivalent nonlinear noise, wherein the process to randomly generate the white noise comprises:
- generating a group of Chi-square distribution random variables K; and
- subtracting a mean value of the random variables K from the random variables K to obtain the white noise, or, the process to randomly generate the white noise comprises:
- generating a group of Chi-square distribution random variables K; and
- subtracting the random variables K from a mean value of the random variables K to obtain the white noise.

7. The apparatus according to claim 6, wherein the evaluating comprises:
- summing up the equivalent nonlinear noise and a transmitted signal passing through a channel linear Finite Impulse Response (FIR) filter to generate a first signal interfered by the equivalent nonlinear noise; and
- performing signal processing on the first signal to obtain a first bit error rate (BER) evaluation result.

8. The apparatus according to claim 7, wherein the evaluating further comprises:
- generating an additive Gaussian white noise by using an additive Gaussian white noise generation method;
- summing up the additive Gaussian white noise and the first signal to generate a second signal that is simultaneously interfered by the equivalent nonlinear noise and the additive Gaussian white noise; and
- performing signal processing on the second signal to obtain a second bit error rate (BER) evaluation result.

9. An apparatus comprising:
- a memory; and
- a processor coupled to the memory, the processor to control execution of a process including,
  - generating two mutually independent groups of equivalent nonlinear noises of real value by respectively
    - randomly generating a white noise obeying zero-mean Chi-square distribution; and
    - filtering the white noise by using a spectrum of equivalent nonlinear noise as a filter to obtain an equivalent nonlinear noise;
  - combining the two mutually independent groups of equivalent nonlinear real noises of real-value to obtain corresponding complex noises; and
  - applying a random common phase rotation to the complex noises to obtain equivalent nonlinear noises of complex noises.

* * * * *